United States Patent [19]

Yoshino et al.

[11] Patent Number: 5,798,710
[45] Date of Patent: Aug. 25, 1998

[54] DATA COMMUNICATION APPARATUS HAVING IMPROVED TRANSMISSION EFFICIENCY

[75] Inventors: Motoaki Yoshino, Tokyo; Makoto Mikuni, Yokohama, both of Japan

[73] Assignee: Canon Kabushiki Kaisha, Tokyo, Japan

[21] Appl. No.: 841,338

[22] Filed: Apr. 30, 1997

Related U.S. Application Data

[63] Continuation of Ser. No. 478,996, Jun. 7, 1995, abandoned, which is a continuation of Ser. No. 288,165, Aug. 10, 1994, abandoned, which is a continuation of Ser. No. 888,278, May 26, 1992, abandoned, which is a continuation of Ser. No. 663,198, Feb. 28, 1991, abandoned, which is a continuation of Ser. No. 331,173, Mar. 31, 1989, abandoned.

[30] Foreign Application Priority Data

Apr. 5, 1988 [JP] Japan ................... 63-082331
Apr. 20, 1988 [JP] Japan ................... 63-095785

[51] Int. Cl.$^6$ ............................................. H04N 1/00
[52] U.S. Cl. ................. 340/825.52; 358/407; 358/440; 379/100
[58] Field of Search .......... 340/825.44, 825.52; 358/404, 407, 440, 444; 379/100, 209, 355

[56] References Cited

U.S. PATENT DOCUMENTS

| | | | |
|---|---|---|---|
| 3,958,088 | 5/1976 | Vieri | 358/407 |
| 4,113,992 | 9/1978 | Gorham et al. | 358/440 |
| 4,207,598 | 6/1980 | Reich et al. | 358/402 |
| 4,353,097 | 10/1982 | Takeda et al. | 379/100 |
| 4,586,128 | 4/1986 | DeWoskin | 340/825.5 |
| 4,607,289 | 8/1986 | Kurokawa | 358/440 |
| 4,646,160 | 2/1987 | Iizuka et al. | 358/402 |
| 4,754,335 | 6/1988 | Izawa et al. | 358/440 |
| 4,811,111 | 3/1989 | Kurokawa | 358/440 |
| 4,994,926 | 2/1991 | Gordon et al. | 358/440 |

FOREIGN PATENT DOCUMENTS

| | | | |
|---|---|---|---|
| 59-225663 | 12/1984 | Japan . | |
| 0000161 | 1/1985 | Japan | 358/402 |
| 2089618 | 6/1982 | United Kingdom | 358/440 |

OTHER PUBLICATIONS

Websters New World Dictionary, 3$^{rd}$ College Ed., 1988, p. 1278.

*Primary Examiner*—Michael Horabik
*Assistant Examiner*—Andrew Hill
*Attorney, Agent, or Firm*—Fitzpatrick, Cella, Harper & Scinto

[57] ABSTRACT

A data communication apparatus includes a reserving circuit for reserving transmission of data, a communicating circuit for performing data communication, and a communication control circuit for determining transmission destinations for a plurality of data reserved by the reserving circuit and simultaneously transmitting all data destined to a given transmission destination to this destination.

10 Claims, 10 Drawing Sheets

FIG.7

| FIELD 71 | 72 | 73 | 74 |
|---|---|---|---|
| TEL NUMBER OF DESTINATION | TIME | PAGE | ADDRESS |
| 03 758 2111 | 16:01 | 1 | 10000 |
| | | 2 | 10101 |
| | | ~ | ~ |
| | | n+1 | 11111 |
| | | | 12000 |
| | | ~ | ~ |
| | | n+m | 12345 |

FIG.10
PRIOR ART

| TEL NUMBER OF DESTINATION | TIME | PAGE | ADDRESS |
|---|---|---|---|
| 03 758 2111 | 16:00 | 1 | 10000 |
| | | 2 | 10101 |
| | | ~ | ~ |
| | | n | 11111 |

| TEL NUMBER OF DESTINATION | TIME | PAGE | ADDRESS |
|---|---|---|---|
| 03 758 2111 | 16:02 | 1 | 10000 |
| | | 2 | 10101 |
| | | ~ | ~ |
| | | n | 11111 |

71, 72, 73, 74

DATA COMMUNICATION APPARATUS HAVING IMPROVED TRANSMISSION EFFICIENCY

This application is a continuation of application Ser. No. 08/478,996 filed Jun. 7, 1995, which was a continuation of application Ser. No. 08/288,165 filed Aug. 10, 1994, which was a continuation of application Ser. No. 07/888,278 filed on May 26, 1992, which was a continuation of application Ser. No. 07/663,198 filed on Feb. 28, 1991, which was a continuation of application Ser. No. 07/331,173 filed on Mar. 31, 1989, all now abandoned.

BACKGROUND OF THE INVENTION

1. Field of the Invention

The present invention relates to a data communication apparatus and, more particularly, to a data communication apparatus capable of reserving data transmission.

2. Related Background Art

A facsimile machine is known as a conventional apparatus of this type to transmit, e.g., image data.

In particular, an apparatus incorporating a large-capacity memory or using an external memory device such as a magnetic disk is known whereby image data for a plurality of destinations are stored and sequentially transmitted.

In the above system for storing transmission images for the plurality of destinations in the image memory, destination telephone numbers and image data (and data pointers which indicate the image data) are stored as a set of data blocks, and each data block is accessed to perform transmission every transmission cycle.

In a conventional apparatus of this type, the telephone line must be disconnected upon every transmission cycle of one data block, and calling is made using a telephone number of the next block, thereby transmitting the next image data. According to this control, even if a plurality of transmission reservations are made for a given destination, i.e., even if the image data is read and the destination telephone number is input for a given destination, the communication line is disconnected between the adjacent data blocks even if these transmission cycles are successive. In transmission of the second data block, calling and communication procedures must be repeated from the beginning.

This also applies to the case wherein a transmission reservation is made for a given destination during transmission of image data to the given destination. This control prolongs the processing time and is disadvantage in communication cost in a case such as local communication in which communication charges are identical within a predetermined period of time.

There is available another conventional facsimile machine capable of performing a transmission reservation operation, i.e., an operation for transmitting an original image to a destination at designated time. In transmission reservation processing, an original is loaded on a reader unit, and an original image is read and transmitted in real time when the current time reaches the designated time. However, according to this system, the reader unit is occupied by the original until the designated time.

In order to solve the above problem, transmission image information is read and stored in an image memory in advance, and the stored image is transmitted at the designated time. In this transmission reservation by using memory transmission, the reader unit is not occupied by the original, and transmission reservations for a large number of destinations can be simultaneously performed.

FIG. 8 shows control procedures of a transmission reservation by memory transmission.

In step S51 of FIG. 8, it is determined by predetermined input operations at an operation panel 15 whether image transmission is selected. If YES in step S51, the flow advances to step S52. However, if NO in step S51, the flow advances to step S57.

It is then determined in step S52 whether a transmission "reserve" mode is set for transmitting information at reserved time. If NO in step S52, the read image is sequentially transmitted. That is, m pages of image data are read, and the read images are transmitted in step S54.

In the transmission reserve mode, n pages of image data are read in step S55, and a transmission reserving table is made in step S56. A structure of the transmission reserving table is shown in FIG. 10.

FIG. 10 shows a structure of a transmission reserving table set in part of a memory. The table consists of fields 71 to 74. Destination telephone numbers are stored in the field 71. Reserved times at which transmission is performed are stored in the field 72. Identification data of pages of the read image data are stored in the field 73. Start address data of the image memory for storing the image data of the pages in correspondence with the page identification data of the field 73 are stored in the field 74.

When the operation in step S56 is completed, the flow returns to step S51. If the transmission mode is determined in step S51 to be not designated, the flow advances to step S57 to check if a transmission reservation is made. This check is performed by checking the logical level of a flag.

If NO in step S57, the flow returns to step 51. However, if YES in step S57, it is determined in step S58 whether the time stored in the field 72 of FIG. 7 coincides with the time of the timer incorporated in a CPU. If the current time has not reached the reserved time, the flow returns to step S51. However, if the current time reaches the reserved time, the flow advances to step S59. The n pages of image data are transmitted in step S59. In this case, data readout operations are controlled by using data in the fields 73 and 74 in FIG. 7.

The transmission reserving table is removed from the memory in step S60, and the flow returns to step S51.

The basic transmission reserve control has been described above. When the first transmission reservation destination is called, this called station may be busy (during transmission). In this case, recalling is performed by the procedures shown in FIG. 9.

In step S61 of FIG. 9, it is determined whether the transmission mode is selected in the same manner as in step S51. When image transmission is performed, the flow advances to step S62, and the destination telephone number is settled in accordance with an input at a keyboard. In step S63, n pages of image data are read, and a new transmission reserving table is made in step S64. In this case, the structure of the transmission reserving table is the same as that shown in FIG. 10.

However, when image transmission is determined in step S61 to be not performed, the flow advances to step S70. It is determined in step S70 whether a transmission reservation is made. If NO in step S70, the flow returns to step S61. However, if YES in step S70, the flow advances to step 71 to determine whether the current time has reached reserved time. If No in step S71, the flow returns to step S61. However, if YES in step S71, the flow advances to step S65.

In step S65, the destination is called by using the telephone number data of the transmission reserving table in either the normal transmission mode or the transmission reserve mode. In step S66, it is determined whether the destination is busy.

If YES in step S66, the flow advances to step S69, and recalling is performed after a lapse of a predetermined period of time in the field 72 (2 minutes in this case) from the state of FIG. 10, as shown in FIG. 11.

However, if NO in step S66, the flow advances to step S67 and the stored image data is transmitted. The reserving table is removed from the memory in step S68. When the destination is determined to be busy, the reserved time is prolonged through step S69. The destination is called again at the updated time.

The following problems are posed by the above transmission reserve control by conventional memory transmission.

In the procedures of FIG. 8, the transmission reserved time of a destination B which is already reserved may pass during reading of the image data to be transmitted to a given destination A subjected to normal sequential transmission. In this case, the image data is transmitted to the destination B after the image data is transmitted to the destination A.

If the destinations A and B have the same telephone number, calling is performed to these destinations twice within a very short period of time. The communication procedures are repeated in either communication, and the communication time is prolonged. Therefore, utilization efficiency of the apparatus is degraded. In addition, the apparatus has a disadvantage in communication cost in a line to which a telephone charge is made in accordance with a line connecting time.

In the procedures shown in FIG. 9, the above problem occurs. That is, during a time period in which the destination A is called and recalling is to be made due to a busy state of the destination A, information can be transmitted to the destination B subjected to a transmission reservation unless the communication line is connected. In this case, if the destinations A and B are the same station, calling is performed twice. For this reason, the apparatus is not advantageous in efficiency and communication cost as described above.

SUMMARY OF THE INVENTION

It is an object of the present invention to solve the above problems and to improve a data communication apparatus.

It is another object of the present invention to simultaneously transmit all reserved data for a single destination.

It is still another object of the present invention to simultaneously transmit the reserved data if the current time is almost the transmission reversed time and the current destination is the same as that reserved before.

The above and other objects, features, and advantages of the present invention will be apparent from the following detailed description of preferred embodiments in conjunction with the accompanying drawings.

BRIEF DESCRIPTION OF THE DRAWINGS

FIG. 7 is a view showing a transmission reserving table controlled by the set of control procedures shown in FIG. 6;

FIGS. 10 and 11 are views showing general structures of transmission reserving tables, respectively.

DETAILED DESCRIPTION OF THE PREFERRED EMBODIMENTS

Preferred embodiments of the present invention will be described in detail with reference to the accompanying drawings.

In the following descriptions, facsimile machines are exemplified as data communication apparatuses. However, the present invention is not limited to the facsimile machine but is applicable to other data communication apparatuses (e.g., teletex communication, wordprocessor communication, and personal computer communication) which allow transmission reservations.

Figure 1:
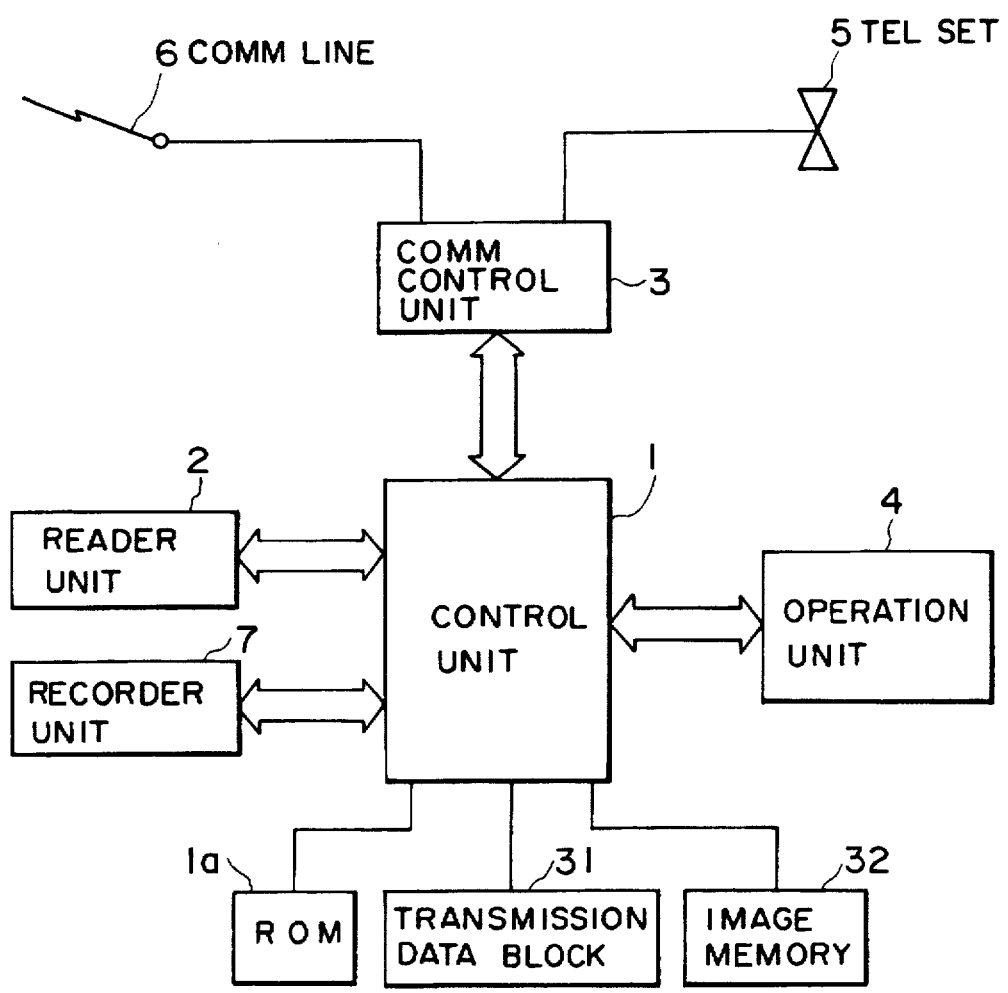
FIG. 1 is a block diagram showing an arrangement according to a first embodiment of the present invention.

FIG. 1 is a block diagram showing an arrangement of a first embodiment of the present invention.

Referring to FIG. 1, a control unit 1 controls the overall operations of the facsimile machine and comprises a microprocessor or the like. The control unit 1 is connected to respective memory means required for control and respective circuit components to be controlled through data and address buses.

More specifically, the control unit 1 is connected to a ROM 1a for storing permanent programs (to be described later) and constants required for control.

Original image data is read by a reader unit 2 constituted by a CCD sensor and an original convey system. The received image data or image data read by the reader unit 2 during copying is recorded by a recorder unit 7 constituted by a thermal printer or an ink-jet printer.

Transmission/reception of image data and a procedure signal with respect to a communication line 6 is performed through a communication control unit 3. The communication control unit 3 includes a modem for modulating/demodulating the image and procedure signals, and an NCU for performing line connection control with a line control telephone set (or handset) 5 or holding a loop.

Communication operations are controlled by the control unit 1 in accordance with key inputs at an operation unit 4. The operation unit 4 comprises a keyboard such as a ten-key pad and a display unit such as a liquid crystal display unit.

Referring to FIG. 1, the facsimile machine includes memories 31 and 32 comprised of programmable memories such as a RAM and a magnetic disk drive.

More specifically, the memory 31 is referred to as a transmission data block 31, and the memory 32 is referred to as an image memory 32. The transmission data block 31 stores data pointers in units of blocks for the image data stored in the image memory 32. The image memory 32 actually stores the image data. In this embodiment, two separate memories are used. However, these memories may be allocated in a single linear memory space.

Figure 2:
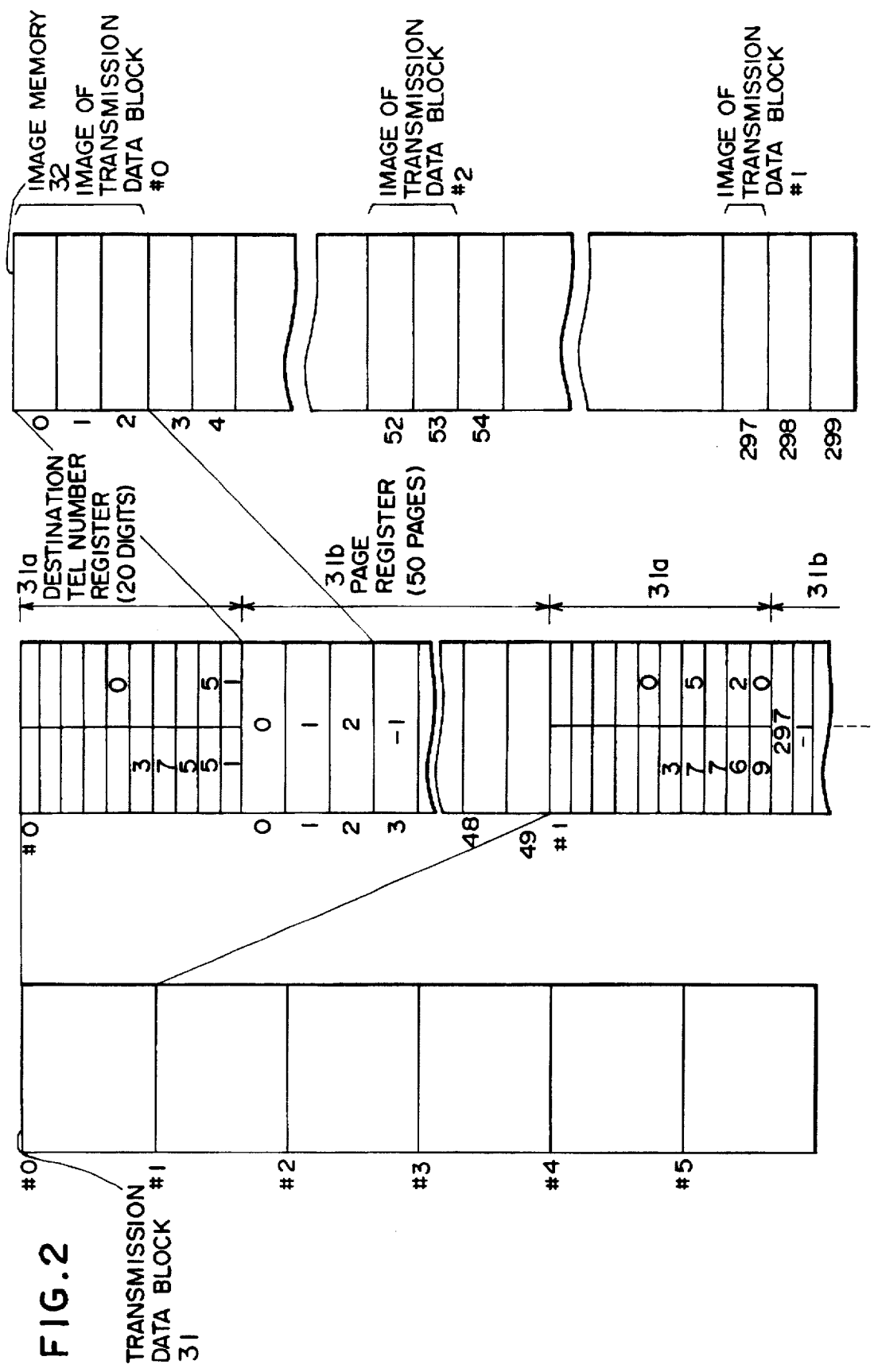
FIG. 2 is a view showing a structure of transmission data blocks and an image memory in the first embodiment.

FIG. 2 shows data structures of the transmission data block 31 and the image memory 32.

As shown in the left half of FIG. 2, the transmission data block 31 consists of six blocks #0 to #5. Block #0 is a transmission executive data block. Upon designation of transmission, image data designated by a register in block #0 is transmitted. Blocks #1 to #5 are transmission reserve data blocks. When the content of block #0 is transmitted, the contents of blocks #1 to #5 are sequentially transferred to executive block #0 and transmitted therefrom.

The structures of blocks #0 and #1 are illustrated at the center of FIG. 2.

The image memory 32 is a page memory for sufficiently storing image data of, e.g., an A4 size and has a memory area for 300 pages, i.e., 0th to 299th pages.

As shown in the center of FIG. 2, a telephone number register 31a for storing 20-digit destination telephone numbers is allocated at the start portion of the transmission data block #0. A page register 31b for storing pointers for designating the 0th to 299th pages of the image memory 32 is allocated after the telephone number register 31a. Data "0", "1", and "2" are stored at the start portion of the page register 31b, as shown in FIG. 2. These numbers represent the 0th, 1st, and 2nd pages of the image memory 32.

Data "−1" which represents the end of data is stored in the fourth register (3) of the page register 31b. The structures of data blocks #1 to #5 are the same as that of data block #0. For example, data block #1 stores the telephone numbers and page numbers (297) of the memory which store the image data.

With the above arrangement, when the control unit 1 reads data block (30) information to be transmitted, calling is performed using the content of the telephone number register 31a, and image data stored on the respective pages of the image memories which are represented by the registers of the page register 31b are transmitted to the destination.

Figure 3:
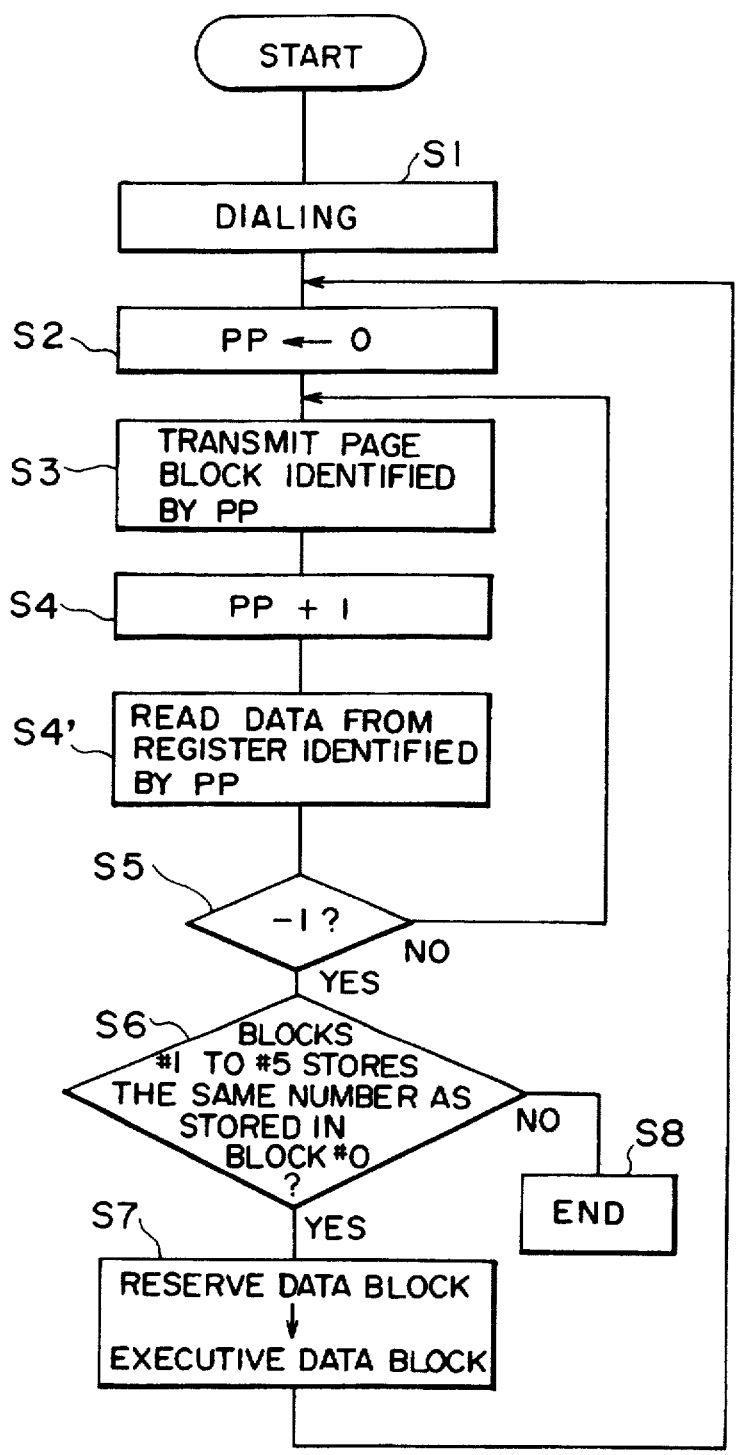
FIG. 3 is a flow chart showing control procedures of a control unit of the first embodiment.

An operation of the above arrangement will be described with reference to a flow chart of FIG. 3. The procedures of FIG. 3 are stored as a control program in the ROM 1a.

The known transmission reserve operations, i.e., input of the telephone number, and reading of the image data by the reader unit 2, are performed prior to actual transmission. Telephone number data and page designation data are sequentially stored in blocks #0 to #5 of the transmission data block 31. Image data read by the reader unit 2 are sequentially stored in empty pages of the image memory 32.

When an image data transmission command is input from the operation unit 4 by a predetermined key input operation, the destination is called using dial data stored in the telephone number register 31a of block #0 of the transmission data block 31 in step S1. In step S2, a pointer PP for designating a register in block #0 of the transmission data block 31 is reset, thereby selecting block #0 as a transmission executive block.

In step S3, the image data stored on the page of the image memory 32 which is identified by the register of the page register 31b which is designated by the pointer PP is transmitted.

In step S4, the pointer PP is incremented by one. The flow then advances to step S4'. In this step, the content of the register of the page register 31b which is identified by the pointer PP is read out. It is determined in step S5 whether the register value is "−1". If NO in step S5, the page block to be transmitted is stored in the image memory 32. The flow returns to step S3, and transmission of the page block is repeated. By the loop of steps S3 to S5, the image data stored on pages 0 to 2 of the image memory 32 is transmitted.

When data "−1" is read out in step S5 (i.e., when the content of register 3 of the page register 31b is read out), the flow advances to step S6. It is determined in step S6 whether the same telephone number data as that stored in the telephone number register 31a of data block #0 which currently transmits data is stored in the telephone number registers 31a of blocks #1 to #5 of the transmission data block 31. If NO in step S6, the line is disconnected in step S8, and transmission processing is ended. However, if YES in step S6, the flow advances to step S7.

In step S7, the content of the data block (i.e., one of blocks #1 to #5) which stores the same telephone number as that in the telephone number register 31a of data block #0 and which is detected in step S6 is transferred to data block #0. Therefore, the data block representing the destination subjected to transmission is transferred to block #0 as the executive data block. The flow then returns to step S2, and the above operations are repeated.

With the above arrangement, when the identical telephone number data are stored in the telephone number registers 31a of blocks #0 to #5 of the transmission data block 31, the data to the same destination are continuously transmitted by the loop of steps S2 to S7 without disconnecting the line.

Unlike the conventional apparatus, the line need not be disconnected in the presence of a transmission reservation to a given destination during transmission to the given destination, and communication cost is not increased. With an arrangement in which image transmission and transmission reserve operations are simultaneously performed, the line need not be disconnected by the procedures of FIG. 3 even if a transmission reservation is made for a given destination during transmission of data to the given destination. Therefore, the image data can be continuously transmitted to the given destination.

With the above arrangement, procedure time before and after communication can be shortened, and the communication cost can be reduced accordingly.

A second embodiment of the present invention will be described wherein a plurality of image data are simultaneously transmitted under the condition that the current transmission time is close to reserved time in addition to the condition that the transmission destination of the image data subjected to the transmission reservation is the same as that to which data is currently transmitted.

Figure 4:
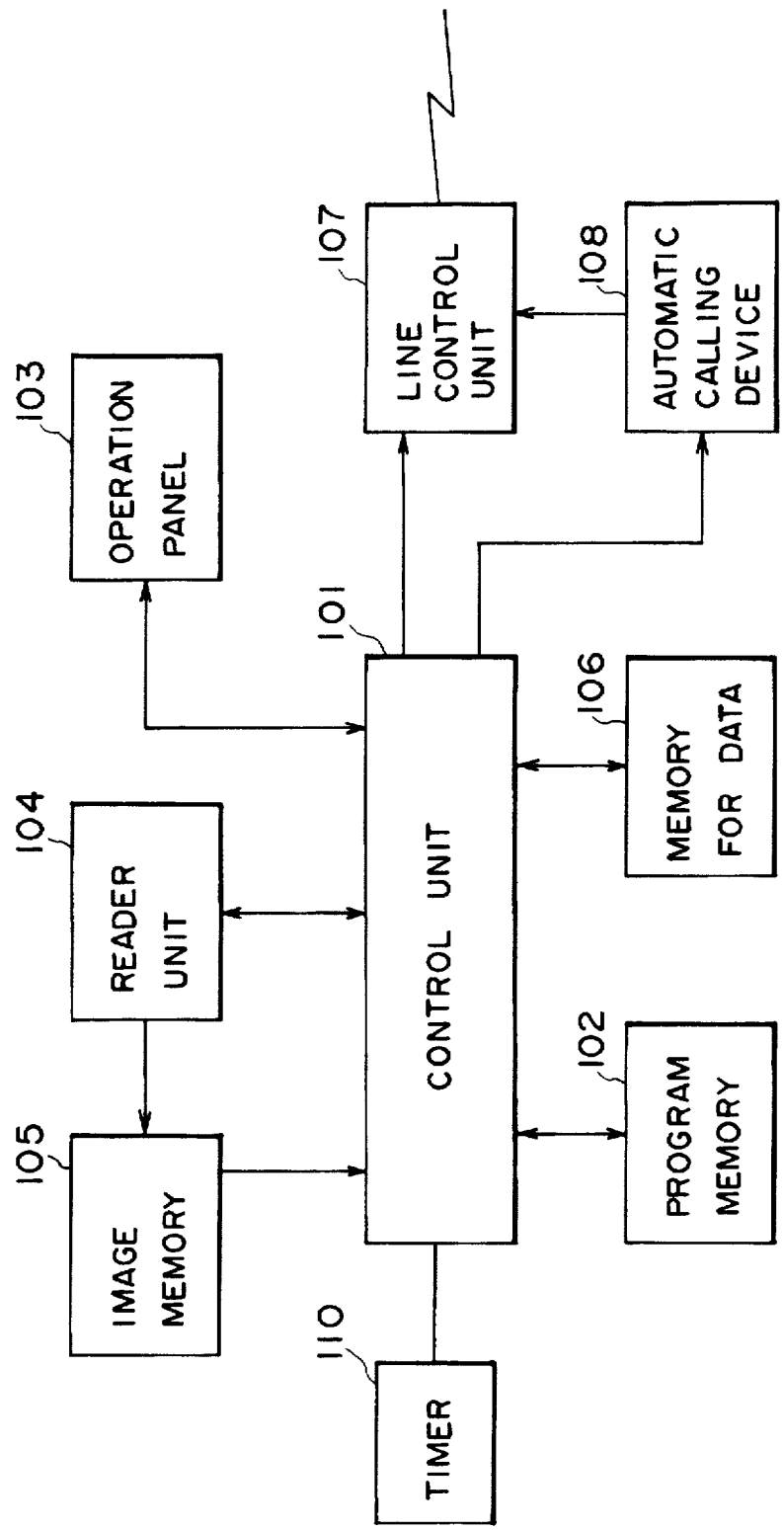
FIG. 4 is a block diagram showing an arrangement according to a second embodiment of the present invention.

FIG. 4 is a block diagram showing an arrangement according to the second embodiment.

Referring to FIG. 4, a control unit 101 comprises a microprocessor or the like and controls the respective circuit components of a facsimile machine and performs image communication.

A line control unit 107 performs modulation and demodulation of procedure and image signals and line control, and includes a modem and an NCU. The line control unit 107 is connected to an automatic calling device 108 including a dial signal generator. The automatic calling device 108 receives telephone number data from the control unit 101 and transmits the corresponding dial signal to a telephone line through the line control unit 107.

An original is read by a reader unit 104. The reader unit 104 includes a CCD line sensor and an original convey system.

Communication operations are controlled through an operation panel 103.

The control unit 101 is connected to three memories 102, 105, and 106 which are referred to as a program memory 102, an image memory 105, and a memory 106 for data. Control programs are stored in the program memory 102 comprised of a ROM or the like. Image information read by the reader unit 104 and to be transmitted is stored in the image memory 105 comprised of a RAM or the like.

The memory 106 for data stores transmission reserving tables shown in FIGS. 10 and 11 and comprises a RAM or the like. In this embodiment, transmission reserving tables almost the same as those of FIGS. 10 and 11 are used. A timer 110 for controlling reserved time is arranged in the control unit 101.

An operation of the above arrangement will be described below.

Figure 5:
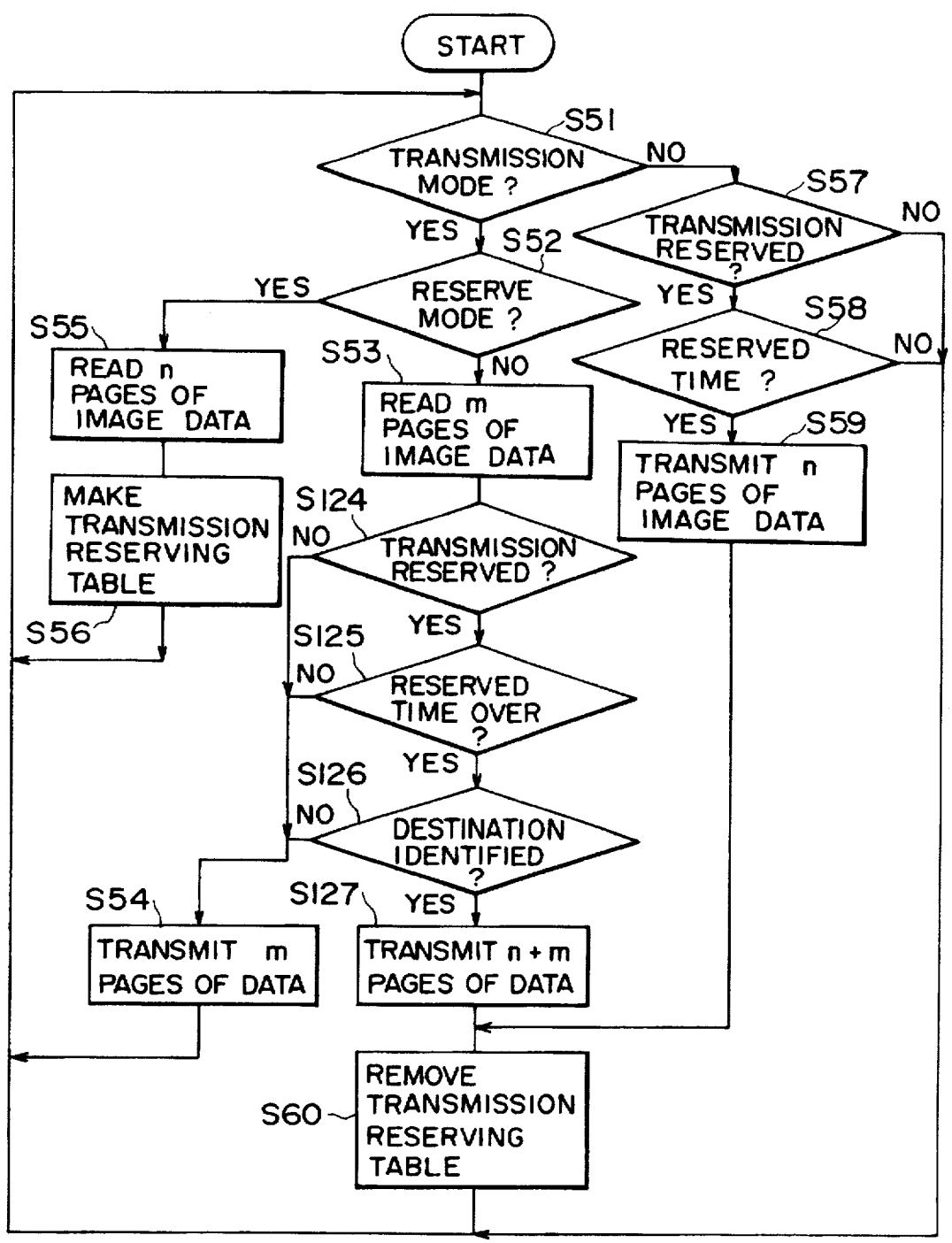
FIG. 5 is a flow chart showing a set of control procedures of the second embodiment.

FIG. 5 shows communication procedures of the control unit 101 which are stored in the program memory 102 shown in FIG. 4. The procedures in FIG. 5 aim at solving the conventional communication procedures shown in FIG. 8. Steps 124 to 127 are added to the procedures of FIG. 8 in FIG. 5.

Figure 8:
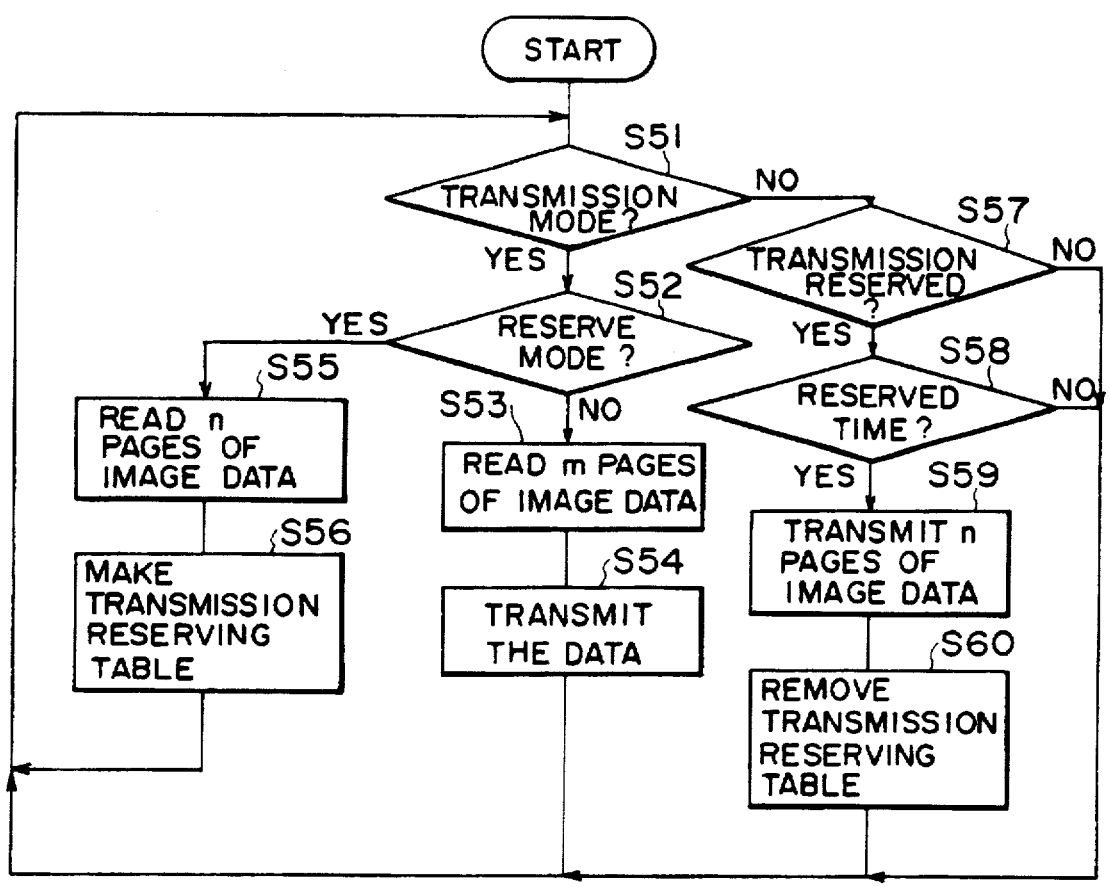
FIG. 8 is a flow chart showing a conventional set of control procedures.

The decision blocks in steps S51 and S52 in FIG. 5 are the same as those in FIG. 8. When transmission is designated on the operation panel 103 and a transmission reserve mode is selected, n pages of image data are read by the reader unit 104 and the read image are stored in the image memory 105 in steps S55 and S56 in the same manner as in the conventional apparatus. At the same time, a transmission reserving table shown in FIG. 10 is formed in the memory 106.

When image transmission is not designated, the memory 106 is accessed to determine in steps S57 to S59 whether a reservation is made and the current time has reached reserved time. If the current time has reached the reserved time, n pages of the image data reserved in step S59 are transmitted. Thereafter, the transmission reserving table is removed in step S60.

When the transmission reserve mode is not set, sequential transmission is performed. The flow advances from step S52 to step S53, and m pages of image data are read by the reader unit 104 in the same manner as in the conventional apparatus. It is then checked in step S124 whether a transmission reservation is made. This decision block is the same as that in step S57.

If YES in step S124, the reserved time in the memory 106 and time information of the timer 110 are referred to so as to determine in step S125 whether the current time has passed the reserved time. If YES in step S125, the content of the transmission reserving table corresponding to the reservation is referred to so as to determine whether the destination subjected to sequential transmission is the same as that subjected to the transmission reservation. This determination is performed by comparing the destination telephone number input from the operation panel 103 with the destination telephone number stored in a field 71 of the reserving table.

If NO in any of steps S124 to S126, m pages of image data read in step S53 are transmitted through the line control unit 107.

If YES in all steps S124 to 126, i.e., when the destination subjected to sequential transmission is determined to be the same as that subjected to the transmission reservation, the flow advances to step S127. The n pages of image data read in step S55 and the m pages of the image data read in step S53 are continuously transmitted in step S127. In this case, the telephone number of the destination is read from the field 71 of the transmission reserving table and is transferred to the automatic calling device 108. The automatic dialing device 108 transmits a dial signal on the basis of the input telephone number data.

That is, in step S127, the n and m pages of data to the given destination are continuously transmitted. For example, assume that a transmission reservation for a given destination is made for time 16:00, as shown in FIG. 10, and that reading of image for sequential transmission in step S53 is started at time immediately before time 16:00. Under these assumptions, when sequential transmission to the given destination in step S53 is ended at time 16:01 and the telephone number of the given destination subjected to sequential transmission is the same as that of the destination subjected to the transmission reservation, the line is not disconnected, and n and m pages of image data are continuously transmitted to the given station.

When transmission in step S127 is completed, the flow advances to step S60, and the transmission reserving table is removed from the memory 106. The flow then returns to step S51.

With the above arrangement, when sequential transmission is performed, whether a transmission reservation is made is checked. In addition, if the destination subjected to sequential transmission is the same as that subjected to the transmission reservation, all image data to the same destination are continuously transmitted by one call without performing a plurality of calls within a very short period of time. Therefore, utilization efficiency of the facsimile machine can be improved, and the communication cost can be reduced when the telephone charge is made on the basis of the time of use of the telephone line.

In step S125 of FIG. 5, if the current time measured by the timer 110 has not passed the reserved time, normal transmission is performed in step S54. However, if the current time is advanced from the reserved time by a predetermined period of time (e.g., a few minutes required for normal image transmission), the flow may advance to step S126 without going through step S54 to continuously transmit the two image data.

Figure 6:
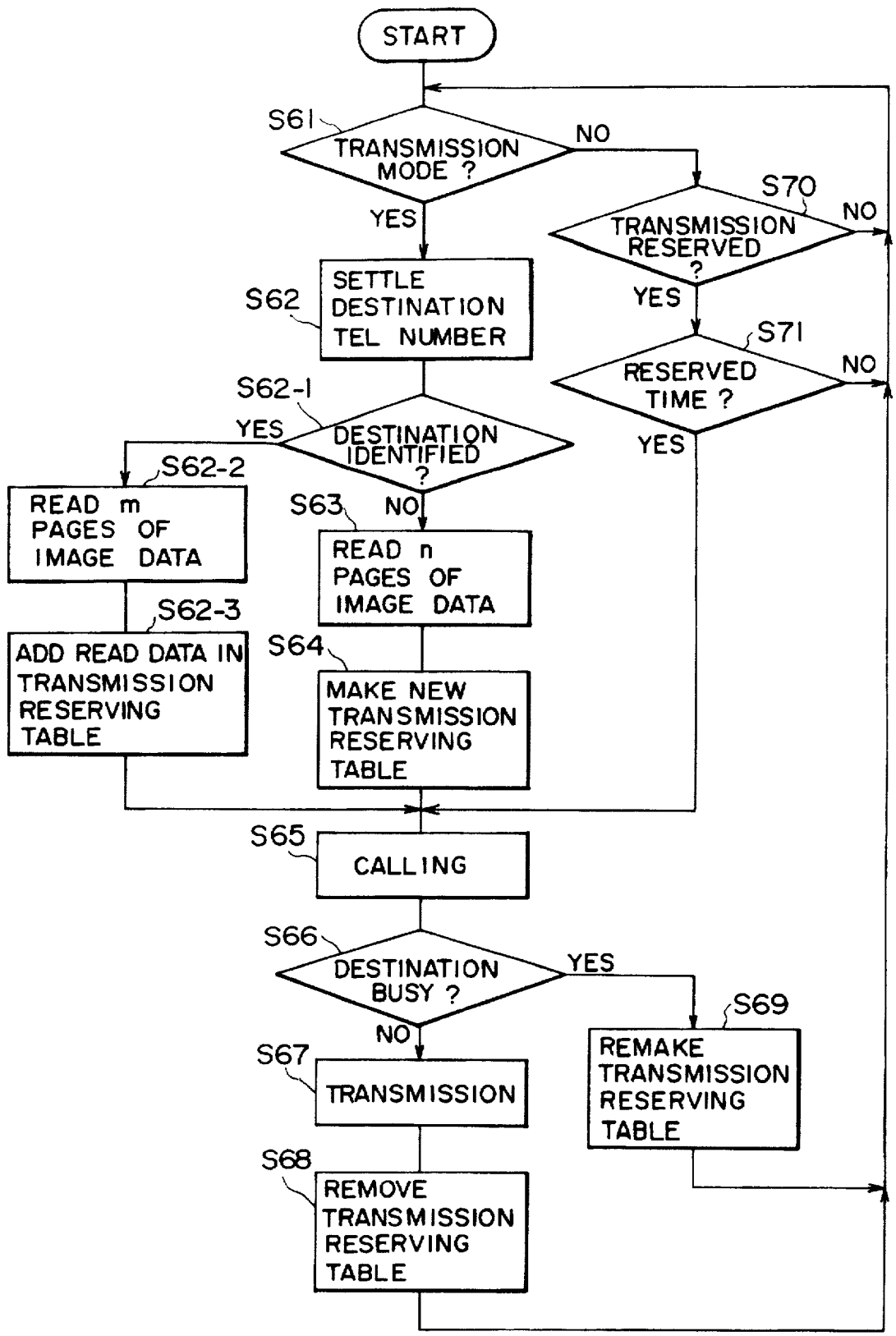
FIG. 6 is a flow chart showing another set of control procedures of the second embodiment.
Figure 9:
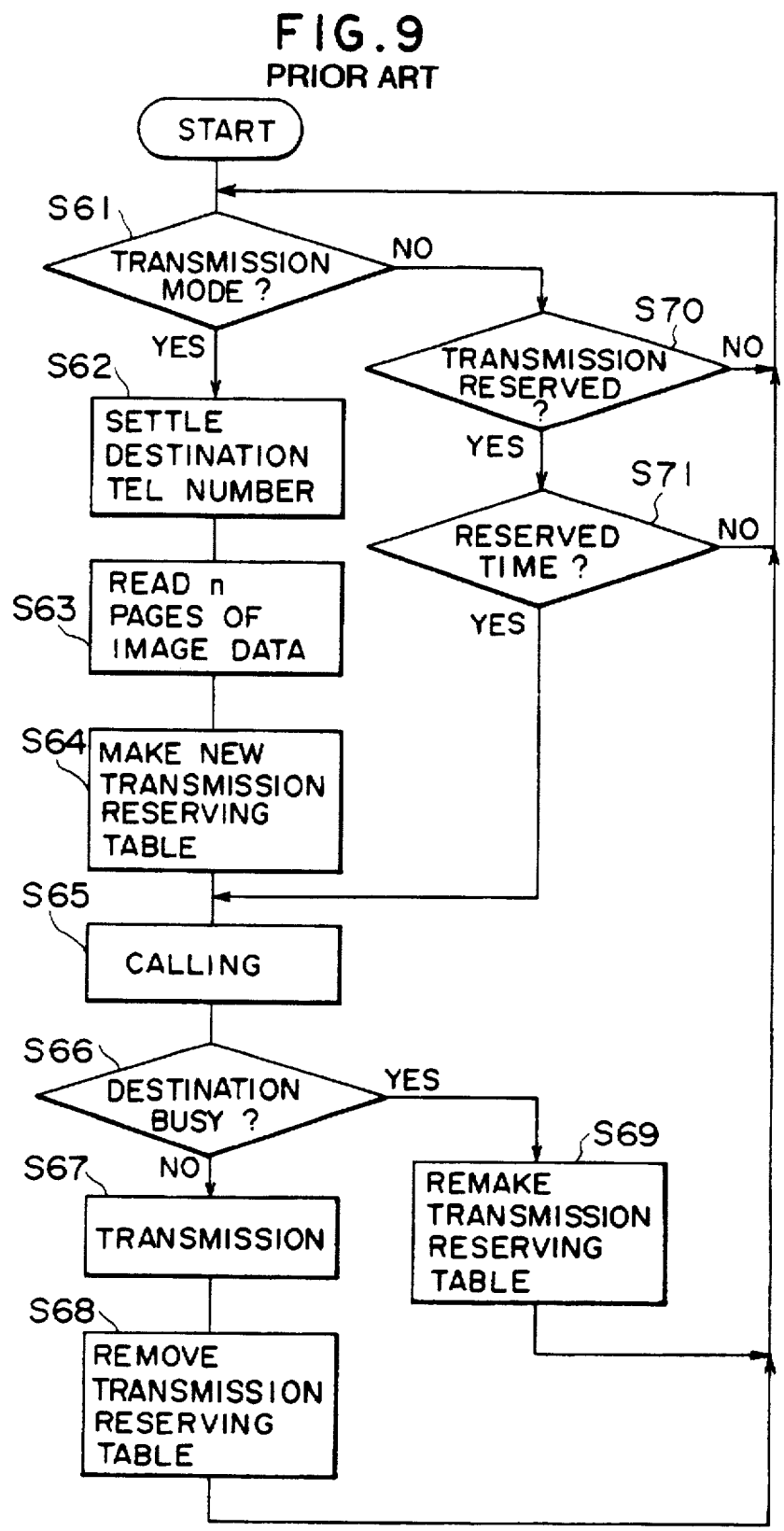
FIG. 9 is a flow chart showing another conventional set of control procedures.

Different communication procedures are shown in FIG. 6. The procedures in FIG. 6 aim at solving the problem in the conventional communication procedures in FIG. 9. Steps S62-1, 62-2, and 62-3 are added to the procedures of FIG. 9 in FIG. 6.

It is determined in step S61 of FIG. 6 whether a transmission mode is designated. When sequential transmission is performed, the flow advances to step S62, and the telephone number is input. The flow advances to step S62-1. However, if the transmission mode is not set, it is determined in steps S70 and S71 whether a transmission reservation is made and the current time has reached the reserved time in the same manner as in the conventional case.

It is determined in step S62-1 whether the destination subjected to sequential transmission is the same as that subjected to transmission reservation. This determination is performed by comparing the input telephone number with the telephone number stored in the field 71 of the transmission reserving table as described above. If YES in step S62-1, the flow advances to step S62-2. However, if NO in step S62-1, the flow advances to step S63 in the same manner as in the conventional case.

In step S62-2, m pages of image data for sequential transmission are read by the reader unit 104, and the image data read in step S62-2 is added to the transmission reserving table in step S62-3. That is, as shown in FIG. 7, page identification data of (n+1) to (n+m) pages and start addresses of the corresponding page data are stored in page and address information of the fields 73 and 74, respectively.

The operations in steps S65 to S69 are the same as those in the conventional case. Calling is performed in step S65.

Whether the destination is busy is determined in step S66. If NO in step S66, transmission is performed in step S67. The transmission reserving table is removed in step S68. If the destination is determined to be busy, the time in the transmission reservation table is changed in step S69 in the same manner as in the conventional case, and the flow returns to step S61.

According to the above control procedures, calling is performed on the basis of a given transmission reservation. When the destination is busy, the transmission reserved time in the transmission reservation table is delayed, and calling is interrupted. When sequential transmission is started prior to the delayed reserved time, the input telephone number is compared with the telephone number stored in the transmission reserving table in step S62-1. When the destination subjected to sequential transmission is the same as the transmission reserved destination, all the image data are transmitted to this destination by one call without disconnecting the line.

As shown in FIG. 7, for example, the transmission reserved time is delayed to time 16:01 due to the busy state of the destination, and sequential transmission is selected prior to time 16:01. In addition, if the input telephone number coincides with the stored telephone number, newly read image data are added to the fields 73 and 74 as image data.

According to the procedures in FIG. 6, even if the reserved time is delayed due to the busy state of the destination called on the basis of the transmission reservation, all the image data can be continuously transmitted by one call upon coincidence of the destination subjected to new sequential transmission and the reserved destination. The same effect as described above can be obtained.

In each embodiment described above, the image communication apparatus which performs communication through the telephone line is exemplified. However, the present invention is not limited to a line system communication apparatus, but is applicable to various data communication apparatuses.

The present invention is not limited to the particular embodiments described above. Various changes and modifications may be made within the spirit and scope of the invention.

What is claimed is:

1. A data communication apparatus, comprising:

input means for inputting data and associated destination information indicating a transmission destination of the associated input data;

first memory means for storing first data input by said input means as reserved data;

second memory means for storing first management information for transmitting the reserved data, said management information including the first destination information associated with the first data;

transmitting means for transmitting data; and control means for, when said input means inputs additional data and associated additional destination information, where the first destination information and the additional destination information are independently defined, (1) comparing the additional destination information with the management information stored in said second memory means, and, when the first destination information and the additional destination information are the same, (2) storing additional management information into said second memory for transmitting the reserved data and the additional data consecutively and causing said transmitting means to transmit the reserved data and the additional data in accordance with the first management information and the additional management information stored in said second memory means, wherein when the first destination information and the additional destination information are not same, said control means stores new management information into said second memory means for independently transmitting the additional data.

2. An apparatus according to claim 1, wherein said first and second memory means store plural sets of data and management information corresponding to the respective sets of data.

3. An apparatus according to claim 1, wherein the management information includes file management information of the stored data.

4. An apparatus according to claim 3, wherein said control means adds file management information of the additional data to the management information stored in said second memory means.

5. An apparatus according to claim 1, wherein the management information stored in said second memory means includes information of a data transmission time, and said control means controls said transmitting means to transmit the reserved data stored in said first memory means when a current time reaches a reserved time upon receipt of a signal having a predetermined frequency.

6. A data communication method, comprising the steps of:

inputting data and associated destination information indicating a transmission destination of the associated input data;

storing first data input at said input step as reserved data;

storing first management information for transmitting the reserved data, the management information including the first destination information associated with the first data; and controlling, when said input step inputs additional data and associated additional destination information, where the first destination information and the additional destination information are independently defined, (1) to compare the additional destination information with the stored management information and, when the first destination information and the additional destination information are the same, (2) to store additional management information for transmitting the reserved data and the additional data consecutively, and to cause a transmitter to transmit the reserved data and the additional data in accordance with the first management information and the additional management information stored in said second memory means, wherein when the first destination information and the additional destination information are not same, said control step stores new management information into said second memory means for independently transmitting the additional data.

7. A method according to claim 6, wherein said storing step stores plural sets of data and management information corresponding to the respective sets of data.

8. A method according to claim 6, wherein the management information includes file management information of the stored data.

9. A method according to claim 8, wherein said control step adds file management information of the additional data to the stored management information.

10. A method according to claim 6, wherein the stored management information includes information of a data transmission time, and said control step controls the transmitter to transmit the reserved data when a current time reaches a reserved time upon receipt of a signal having a predetermined frequency.

* * * * *

UNITED STATES PATENT AND TRADEMARK OFFICE
CERTIFICATE OF CORRECTION

PATENT NO. : 5,798,710
DATED : August 25, 1998
INVENTOR(S) : MOTOAKI YOSHINO, ET AL.

It is certified that error appears in the above-identified patent and that said Letters Patent is hereby corrected as shown below:

COLUMN 1

Line 47, "disadvantage" should read --disadvantageous--.

COLUMN 2

Line 4, "15" should be deleted.

COLUMN 10

Line 8, "same," should read --the same,--; and
Line 55, "same," should read --the same,--.

Signed and Sealed this

Fifteenth Day of June, 1999

Attest:

Q. TODD DICKINSON

Attesting Officer

Acting Commissioner of Patents and Trademarks